(12) United States Patent
Mitariten

(10) Patent No.: US 11,661,341 B1
(45) Date of Patent: May 30, 2023

(54) INTEGRATED MEMBRANE AND STEAM REFORMER FOR HYDROGEN PRODUCTION

(71) Applicant: Archaea Energy, Inc., Houston, TX (US)

(72) Inventor: Michael J. Mitariten, Pittstown, NJ (US)

(73) Assignee: Archaea Energy, Inc., Houston, TX (US)

(*) Notice: Subject to any disclaimer, the term of this patent is extended or adjusted under 35 U.S.C. 154(b) by 0 days.

(21) Appl. No.: 17/669,966

(22) Filed: Feb. 11, 2022

(51) Int. Cl.
| | |
|---|---|
| C01B 3/50 | (2006.01) |
| B01D 71/52 | (2006.01) |
| B01D 71/40 | (2006.01) |
| B01D 69/10 | (2006.01) |
| B01D 53/047 | (2006.01) |

(52) U.S. Cl.
CPC ............ *C01B 3/503* (2013.01); *B01D 53/047* (2013.01); *B01D 69/10* (2013.01); *B01D 71/40* (2013.01); *B01D 71/52* (2013.01); *B01D 2256/16* (2013.01); *B01D 2256/245* (2013.01); *B01D 2257/304* (2013.01); *B01D 2257/504* (2013.01); *B01D 2257/708* (2013.01); *B01D 2257/80* (2013.01); *C01B 2203/0233* (2013.01); *C01B 2203/0283* (2013.01)

(58) Field of Classification Search
CPC ............ C01B 3/503; C01B 2203/0233; C01B 2203/0283; C01B 2203/042; C01B 3/32; C01B 3/34; B01D 53/047; B01D 69/10; B01D 71/40; B01D 71/52; B01D 2256/16; B01D 2257/304; B01D 2257/504; B01D 2257/80; B01D 2257/708; B01D 2256/245
See application file for complete search history.

(56) References Cited

U.S. PATENT DOCUMENTS

| | | | |
|---|---|---|---|
| 5,776,990 | A | 7/1998 | Hedrick et al. |
| 6,071,326 | A | 6/2000 | Hall |
| 6,572,678 | B1 | 6/2003 | Wijmans et al. |
| 6,579,341 | B2 | 6/2003 | Baker et al. |
| 8,480,789 | B2 | 7/2013 | Sorensen. et al. |
| 8,945,373 | B2 | 2/2015 | Foody |
| 9,040,271 | B2 | 5/2015 | Foody |
| 10,487,282 | B2 | 11/2019 | Foody et al. |
| 10,589,215 | B2 | 3/2020 | Ding et al. |
| 10,723,621 | B2 | 7/2020 | Foody |
| 10,981,784 | B2 | 4/2021 | Foody |
| 2006/0260193 | A1* | 11/2006 | Ryan ............ C01B 3/34 48/198.1 |
| 2014/0186258 | A1* | 7/2014 | Allidieres ............ C01B 3/48 422/162 |

OTHER PUBLICATIONS

"Evaluation of membrane reactor with hydrogenselective membrane in methane steam reforming"; P. Bernardo et al.; Chemical Engineering Science 65 (2010), pp. 1159-1166.

* cited by examiner

*Primary Examiner* — Timothy C Vanoy
(74) *Attorney, Agent, or Firm* — Fishman & Associates, LLC.

(57) ABSTRACT

This invention integrates a membrane with a steam reformer such that a membrane is placed between a raw biogas feed, and a steam reformer to supply a retentate of purified methane feed to the steam reformer and the permeate as fuel to the steam reformer,

30 Claims, 2 Drawing Sheets

INTEGRATED MEMBRANE AND STEAM REFORMER FOR HYDROGEN PRODUCTION

FIELD OF THE INVENTION

This invention generally relates to the production of hydrogen gas from landfill gas.

BACKGROUND OF THE INVENTION

Steam methane reforming is widely used to produce hydrogen from natural gas or naphtha. For "Green" hydrogen, renewable natural gas (RNG) from landfill or digester sources can be used to produce hydrogen from the RNG delivered via pipeline or as produced on-site. The production of RNG from biogas requires pre-treatment of the biogas for impurity removal and, consequently, there is a loss of valuable renewable methane, with associated cost, to meet pipeline quality gas.

Typically, steam methane reforming from RNG involves reacting the methane with $H_2O$ to generate a product that is primarily hydrogen and carbon monoxide. The residual carbon monoxide is "water-gas shifted" to form additional hydrogen and carbon dioxide. This water-gas shift can be accomplished in one or more stages (high-temperature and an optional low-temperature shift reaction). The resulting stream contains nominally 70% hydrogen, a few percent of carbon monoxide and unreacted methane, and about 20% carbon dioxide. This stream is normally treated to remove the impurities using a Pressure Swing Adsorption ("PSA") unit to deliver a purified hydrogen stream.

Steam reforming is a highly endothermic reaction, such that an equivalent of as much as 40% of the RNG can be required to provide fuel to the steam reformer burners. In most cases, the PSA tail gas is used to provide much of this fuel with the balance provided by the feed RNG or an external sourced fuel such as natural gas ("Brown Gas").

Producing hydrogen directly from the raw biogas, such as from a landfill, avoids the need to produce a purified RNG. However, landfill gas contains many impurities including siloxanes, halocarbons, $H_2S$, VOCs and heavy components. Due to the sensitivity of the steam reformer and shift catalysts to such impurities, the removal of these impurities, prior to introduction to the steam reformer is required. Such removal is known in the industry and typically includes one or more adsorption-based units, either regenerable or non-regenerable, and/or membranes. For an example, rubbery membranes are known to permeate siloxanes and other impurities such as halocarbons, $H_2S$, VOCs, heavy components, and water vapor. Further, these membranes can also co-permeate carbon dioxide.

Landfill gas contains nominally 40% of $CO_2$. When fed to a steam reformer this $CO_2$ adds a "heat-sink" that increases fuel demand and does not produce additional hydrogen. Hence, landfill gas with lower levels of $CO_2$ is desirous if used as a feed to the steam reformer.

To meet environmental regulations, volatile organic compounds (VOCs) in waste streams of various industries are often thermally oxidized before being released to the atmosphere. This thermal oxidation process requires the use of additional fuel and energy, has high operational costs, and requires frequent maintenance. As an alternative, these VOCs can be considered as supplemental fuels for the steam reformer.

A few methods are known in the art that integrate the process of removing contaminants from landfill gas and steam reforming the cleaned methane into hydrogen.

U.S. Pat. No. 6,071.326 to Hall, discloses a process in which contaminants such as volatile organic compounds (VOCs) and hydrogen sulfite ($H_2S$) are first respectively removed via an activated carbon-based adsorption system and desulfurization system, from the landfill gas to produce a mixed stream of methane and carbon dioxide. The carbon dioxide is then removed from the methane by membrane separation. The methane free of carbon dioxide is then steam reformed. In this process, a portion of the mixed stream of pure carbon dioxide and methane can be used as fuel for the steam reformer. Hall's process to remove impurities involves multiple apparatus and does not take into consideration of the use of VOCs as a fuel source.

U.S. Patent Application Publication No. 2014/0186258 to Allidieres discloses a method for producing hydrogen by steam-reforming biomethane and purifying the shifted syngas by PSA. The waste gas from the PSA is used as secondary fuel for the reforming furnace. Raw or partially purified biogas is used as the primary fuel for the furnace.

The following U.S. Pat. Nos.: 8,945,373; 9,040,271; 10,487,282; 10,589,215; 10,723,621; and 10,981,784, disclose membrane separation of landfill gas and steam reforming of the purified methane. However, there is no discussion or disclosure of integrating the removal of contaminants and the use thereof as a fuel for steam reforming.

There is a need in the industry to provide sufficient heat and fuel to economically produce "green" hydrogen by steam reforming biogas and, at the same time, reduce environmental impact from the process.

SUMMARY OF THE INVENTION

The present invention is directed towards a system for producing hydrogen from biogas. The system includes a membrane separation unit that is in fluid communication with the biogas feed to permeate bulk impurities such as $H_2S$, VOCs, siloxanes, carbon dioxide and water vapors; a steam reformer that is in fluid communication with the retentate side of the membrane separation unit, to receive feed for the steam reforming treatment, and with the permeate side of the membrane for providing a supplemental fuel for the steam reformer; a downstream water-gas shifter in fluid communication with the steam reformer and a feed of steam $H_2O$ to form a wet stream of hydrogen and carbon dioxide; a pressure swing adsorption (PSA) unit in fluid communication with the water-gas shifter to remove impurities to form a purified hydrogen stream. Optionally, at least one purification unit is in fluid communication with the biogas feed and/or with the retentate side of the membrane separation unit to remove $H_2S$ or other impurities.

The present invention is also directed towards a method to produce hydrogen from biogas, comprising the following steps: optionally compressing in a main compressor a stream of biogas, passing the biogas to a membrane separation unit containing at least one polymeric gas separation membrane having a selectivity for $H_2S$ over $CH_4$, to produce a) a permeate having less than 30% by volume methane and impurities such as $H_2S$, water, siloxane, $CO_2$ and VOCs, and b) retentate having at least 65% by volume methane, and impurities such as $H_2S$, water, siloxane, $CO_2$ and VOCs. Optionally, the retentate is subsequently pretreated to remove residual sulfur and/or other impurities, then the pre-treated or untreated retentate stream is fed to a steam reformer to produce an output stream of hydrogen and carbon monoxide. The output stream is then "water-gas shifted" to produce a wet stream of hydrogen and carbon dioxide. This wet stream is subsequently purified by a swing adsorption ("PSA") unit to remove impurities to produce a purified hydrogen stream. The impurities from the PSA are used as fuel for the steam reformer along with the permeate from the membrane separation unit, either separately or after mixing, The novel system and method simultaneously produce a hydrogen stream of at least 95% purity from biogas, while utilizing a permeate or waste stream from the membrane separation unit as fuel for the steam reformer. This novel process reduces costly multi-stage impurity separation steps.

BRIEF DESCRIPTIONS OF THE DRAWINGS

DETAILED DESCRIPTION OF THE INVENTION

Figure 1:
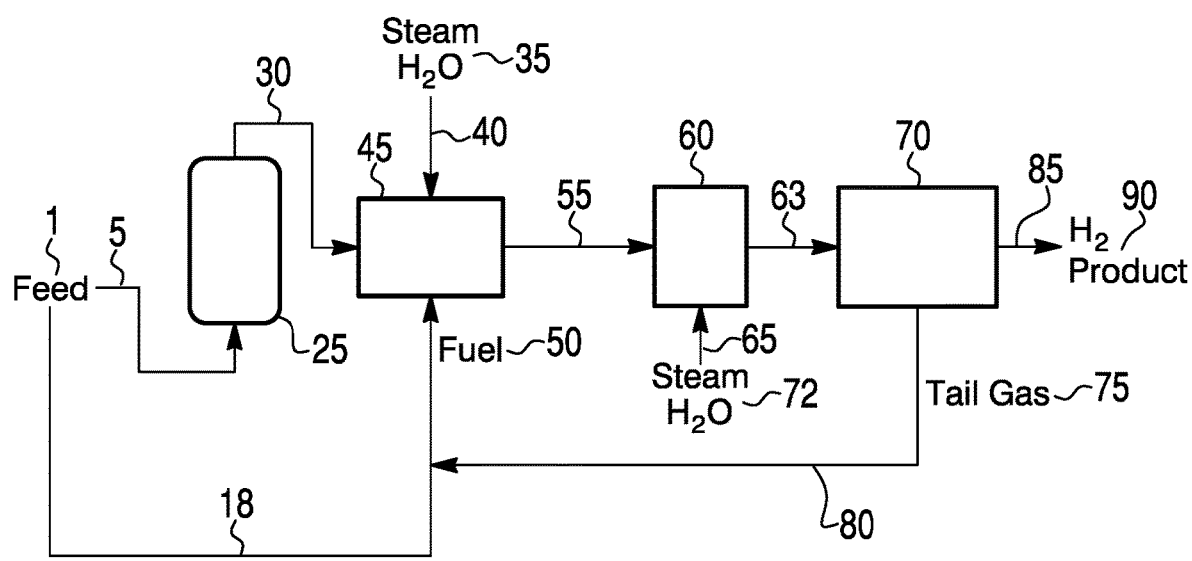
FIG. 1 is a schematic view of a prior art method to produce hydrogen from biogas, using impurities from the PSA as a supplemental fuel.

The present invention is directed towards a system for producing hydrogen from biogas, such that the system comprises a source of biogas feed; optionally a compressor that compresses the biogas feed and, a membrane separation unit in fluid communication with the compressed feed or the uncompressed biogas feed, to permeate bulk impurities such as $H_2S$, VOCs, siloxanes, carbon dioxide and water vapors. Optionally, a pre-treater is located downstream of the retentate side of the membrane separation unit to remove $H_2S$ or other impurities from the retentate. Alternatively, a pre-treater is located prior of the biogas feed entering the membrane separation unit to removal some or all the $H_2S$. A steam reformer is provided in fluid communication with pre-treater or the retentate side of the membrane separation unit, a separate feed of steam $H_2O$. The steam reformer is also in fluid communication with the permeate side of the membrane separation unit to receive the permeate as supplemental fuel for steam reforming. The output from the steam reformer comprises a stream of hydrogen and carbon monoxide. A downstream water-gas shifter is provided in fluid communication with the output stream and a feed of steam $H_2O$ to form a wet stream of hydrogen and carbon dioxide. A pressure swing adsorption (PSA) unit in fluid communication with the water-gas shifter removes impurities to form a purified hydrogen stream containing at least 95% by volume hydrogen. Outlet from the PSA is provided in fluid communication with the steam reformer to send the impurities from the PSA as fuel to the steam reformer, either separately or after mixing with the permeate from the membrane separation unit. Optionally, at least one purification unit is in fluid communication with the membrane separation unit to receive the permeate from the membrane separation unit to remove $H_2S$ and other impurities, and an outlet is provided to such purification unit to send a purified stream as supplemental fuel to the steam reformer.

The present invention is also directed towards a method of producing hydrogen from biogas, comprising optionally compressing a stream of biogas in a main compressor to at least 100 psig, preferably at least 200 psig, and more preferably at least 300 psig. Passing the compressed biogas stream or an uncompressed biogas feed to a membrane separation unit containing at least one polymeric gas separation membrane having a selectivity for $H_2S$ over $CH_4$, to produce a) a permeate having less than 30% by volume methane and impurities such as $H_2S$, water, siloxane, $CO_2$ and VOCs, and b) a stream of methane retentate having at least 65% by volume methane, below 30% by volume of $CO_2$, below 1000 ppm by volume of $H_2S$, below 100 ppm of VOCs and siloxane, and below 0.5% by volume of $H_2O$. Preferably, the permeate is comprised of at most 25% by volume methane, up to 10,000 ppm by volume of $H_2S$, VOCs and siloxane, up to 0.5% by volume of water and up to 85% by volume of $CO_2$. Preferably, the retentate is comprised of at least 70% by volume of methane, below 15% by volume of $CO_2$, below 100 ppm by volume of $H_2S$, below 100 ppm by volume of VOCs and below 100 ppm by volume of siloxane. Alternatively, the compressed or uncompressed biogas feed is treated with a pre-treater to remove some or all the $H_2S$ prior to entering the membrane separation unit. Optionally, the retentate is subsequently pretreated with a catalyst such as ZnO to remove $H_2S$, then the pre-treated or untreated retentate stream is fed to a steam reformer with a stream of steam $H_2O$ to produce an output stream of hydrogen and carbon monoxide. The output stream is then "water-gas shifted" with steam $H_2O$ to produce a wet stream of hydrogen and carbon dioxide. This wet stream is then purified by a swing adsorption ("PSA") unit to remove impurities to produce a purified hydrogen stream containing more than 95% hydrogen. The impurities from the PSA are then sent as fuel to the steam reformer along with the permeate from the membrane separation unit, either separately or after mixing. Optionally, the permeate could be further treated to remove $H_2S$ or other impurities prior to its transport to the steam reformer as supplemental fuel.

This invention integrates a rubbery membrane with a steam reformer such that the rubbery membrane is placed intermediate of a raw biogas feed, and a steam reformer to supply a retentate of purified methane to the steam reformer and a permeate as fuel to the steam reformer. Specifically, in this placement, the high pressure retentate of the rubbery membrane that is reduced in impurities, is sent as a feed to the steam reformer. The low pressure permeate, enriched in the siloxanes, $H_2S$ (if not pre-removed), VOCs, heavy components, carbon dioxide and water vapor is routed as fuel to the steam reformer. Thus, in this invention, the rubbery membrane permeate is valuable since it is used as fuel to the steam reformer.

The steam reformer has a high demand for fuel, thus, the membrane "stage-cut" of the amount of permeate can be matched to supplement fuel demand. The supplemental fuel demand is set by the amount of fuel from the PSA. The overall plant or steam reforming biogas feed can now be optimized to balance the two fuel sources. Optionally, an external fuel source such as from natural gas can be added as fuel to the steam reformer.

As used herein, the term "biogas" typically refers to a mixture of different gases produced from the breakdown of organic matter in the absence of oxygen in an anaerobic digestion process. Biogas can be produced from raw materials such as agricultural waste, manure, municipal waste, plant material, sewage, green waste or food waste, Biogas typically comprises as the main components 45-70% by volume of methane ($CH_4$) and 20 to 50% by volume carbon dioxide ($CO_2$) with lower levels of other components such as $N_2$ and $O_2$, up to 5,000 ppm by volume or more of hydrogen sulfide ($H_2S$), up to 100 ppm by volume of siloxanes, up to 1,000-2,000 ppm by volume of volatile organic compounds (VOCs) and is saturated with water. Biogas also includes landfill gas (LFG), which is derived from solid waste landfills that decompose to organic waste with time, and microbe digestion of a variety of the organic waste to produce methane and $CO_2$ with the wide variety of decomposition products and VOCs above. In either case, biogas includes high concentrations of methane and carbon dioxide, water vapor, and lesser concentrations of VOCs and other contaminants The composition of digester biogas (digester gas) or landfill gas varies depending upon the substrate composition, as well as the conditions within the anaerobic reactor (temperature, pH, and substrate concentration). The biogas or landfill gas of the present invention is entirely distinct from natural gas extracted from a subterranean or subsea geological formation, or that of a producing well. Specifically, the digester biogas or landfill gas of the present invention is essentially free (contains <100 ppm by volume) of butane, methane and propane, As used herein, the term "biomethane" refers to renewable natural gas (RNG) which is a pipeline-quality gas that is fully interchangeable with conventional natural gas and can be used in natural gas vehicles. Biomethane is essentially biogas (the gaseous product of the decomposition of organic matter) that has been processed to purity standards. Like conventional natural gas, biomethane can be used as a transportation fuel in the form of compressed natural gas (CNG) or liquefied natural gas (LNG). Biomethane qualifies as an advanced biofuel under the Renewable Fuel Standards. Typically, the biomethane produced according to the disclosed method and system meets the requirements of SoCal Gas® Rule 30 or PG&E Rule 21, predetermined requirements of the delivery pipeline or the predetermined requirements of the CNG station requirements and has at least 94%, preferably at least 97% by volume, of methane, less than 3% by volume $CO_2$, and less than 100 ppm by volume $H_2S$ and VOCs.

Each component in a landfill gas or digester biogas stream, once contacted with polymeric membranes, has an intrinsic solubility in the polymers. Once dissolved in the polymeric matrix of the membranes, the components diffuse across the polymers from the high-pressure side to the low-pressure side at different rates. The permeability for a given gas component is thus a combination of solubility and diffusivity in a given polymer.

A given membrane may have selectivity for (i.e., is more permeable to), one gas over another gas. As used herein, the term "selectivity" refers to the ratio of two gas permeabilities in permeance, and the measure of the ability of a membrane to separate two gases. The selectivity ($\alpha$), of $CO_2$ over $CH_4$ is calculated according to the below formula:

$$\alpha CO_2/CH_4 = \frac{P*CO_2}{P*CH_4}$$

wherein P is the permeance or the flow flux of the given gas component through membranes and is expressed as 1 gas permeation unit (gpu)=10–6 cm3(S.T.P)/(s·cm2·cm Hg), it is derived from the following equation:

$$J = \frac{P^*}{\delta}(xP_f - yP_p) = \overline{P^*}(xP_f - yP_p)$$

Where:
J=the volume flux of a component ($cm^3$(S.T.P)/$cm^2$.s);
P*=membrane permeability that measures the ability of the membrane to permeate gas ($cm^3$ (S.T.P).cm/(s.$cm^2$.cm Hg));
$\overline{P^*}$=membrane permeance ($cm^3$(S.T.P.)/(s.$cm^2$.cm Hg))*;
$\delta$=the membrane thickness (cm);
$\chi$=the mole fraction of the gas in the feed stream;
y=the mole fraction of the gas in the permeate stream;
$P_f$=the feed-side pressure (cm Hg);
$P_p$=the permeate-side pressure (cm Hg).

More details of the calculation of permeance can be found in "Technical and Economic Assessment of Membrane-based Systems for Capturing $CO_2$ from Coal-fired Power Plants" by Zhai, et al. in Presentation to the 2011 AIChE Spring Meeting, Chicago, Ill., which is incorporated by reference in its entirety.

Membranes for Bulk impurity Removal

These membranes are selective for $H_2S$ over $CH_4$ and for $CO_2$ over $CH_4$. Specifically, the membranes for the bulk impurity removal have a selectivity of at least 10, preferably at least 30, for $H_2S$ over $CH_4$. These membranes also have a selectivity of at least 3, preferably at least 6, for $CO_2$ over $CH_4$.

While these membranes may be asymmetric membranes and comprised of a single polymeric material or polymeric blend, typically the membranes are comprised of a porous polymeric substrate having an additional separation layer or coating. While the polymeric material that forms the substrate is not limited, it is typically selected from the group consisting of polyimides, polysulfones, and polyether ether ketones. The separation layer is supported by the substrate, which provides mechanical strength and may also separate gases. On the other hand, the separation layer is either wholly or primarily responsible for performing the desired separation. These membranes are typically known as "rubbery" membranes and have a specific surface area above 20 $m^2$/g, preferably above 100 $m^2$/g, and a pore size of below 1 micrometer, preferably below 0.25 micrometer, and more preferably below 0.015 micrometer. The membranes are in the form of a flat film, or as a plurality of hollow fibers, In the context of composite hollow fibers, the separation layer may be configured as a sheath surrounding a core made of the support layer. In the case of hollow fibers, the fiber preferably possesses an outside diameter from about 50 to about 50,000 micrometers, more preferably from about 80 to about 1,000 micrometers, with a wall thickness from about 10 to about 1,000 micrometers, preferably from 20 to 500 micrometers. In the case of film, the film preferably possesses a thickness of from about 10 to about 1,000 micrometers, most preferably from about 25 to about 500 micrometers. The film may be optionally supported by a permeable cloth or a screen.

Alternatively, the membrane is in the form of spirally round sheets.

In one type of membrane, the separation layer for the first separation stage membrane is optionally made of a copolymer or block polymer of the formula:

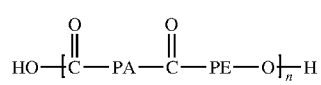

where PA is an aliphatic polyamide having 6 or 12 carbon atoms and PE is either poly(ethylene oxide) poly (tetramethylene oxide). These copolymers are commercially available as poly(ether-b-amide) multiblock copolymers from Arkema under the trade name of PEBAX®, and poly (butylene terephthalate) ethylene oxide copolymer available under the trade name of Polyactive®. Typically, the PEBAX polymers from Arkema include PEBAX 7233, PEBAX 7033, PEBAX 6333, PEBAX 2533, PEBAX 3533, PEBAX 1205, PEBAX 3000, PEBAX 1657, or PEBAX 1074, PEBAX 1657 exhibits a methane permeability of 5.12; see Barren. H. Rabiee, et al., J. Membrane Sci. vol. 476, pp. 286-302 (2015).

Alternatively, the separation layer is made of repeating units of the following monomers, also known as Polyactive® multiblock copolymers:

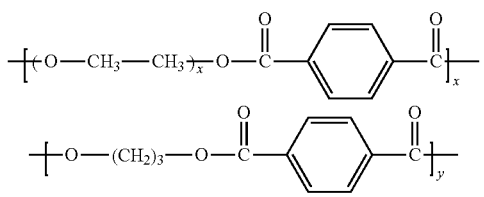

Alternatively, the separation layer of the membrane is made of a copolymer or block polymer of tetramethylene oxide, and/or propylene oxide, or ethylene oxide. These copolymers or block polymers of tetramethylene oxide, and/or propylene oxide, or ethylene oxide may be conveniently synthesized, such as the polyester ether disclosed in U.S. Pat. No. 6,860,920, the polyester ethers of which are incorporated by reference.

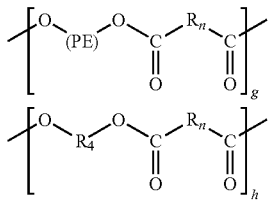

wherein PE may be one or more of the following structures:

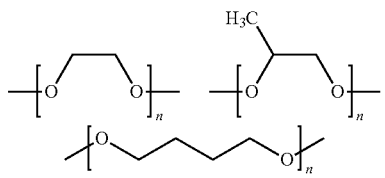

Other copolymers or block polymers of tetramethylene oxide, and/or propylene oxide, or ethylene oxide may be conveniently synthesized, such as polyimide ether disclosed in U.S. Pat. No. 5,776,990, the polyimide ethers of which are incorporated by reference. Useful polyimide base membranes are polyimide membranes sold by Evonik as PuraMem® 280 or PuraMem® S600.

The copolymers can be further obtained by copolymerization of acrylated monomers containing oligomeric propylene oxide, ethylene oxide, or tetramethyelene oxide.

Without being bound by any particular theory, the rubbery membrane operates as follows: the product methane primarily remains on the retentate, high pressure side as a slow gas while water, $H_2S$, $CO_2$ and/or heavy hydrocarbons or VOCs are fast permeating gases that are permeated and removed at the low-pressure permeate side. The permeation of the impurities is due to their higher solubility in the polymeric separation layer, while $CH_4$ permeates at a slower speed than the impurities. Overall $H_2S$, $CO_2$, VOCs, siloxanes, and water are "fast" gases while methane is a "slow" gas. Therefore, the rubbery membrane preferentially permeates water, $H_2S$, $CO_2$ and/or heavy hydrocarbons and VOCs from high pressure to low pressure, leaving behind at high pressure a lean product stream, enriched in methane, with less than about 0.1% by volume of water. Typically, the pressure drops between the feed gas and the retentate gas is less than 50 psi (3.45 bar), preferably less than 30 psi (2.07 bar), or more preferably less than 20 psi (1.38 bar).

Figure 3:
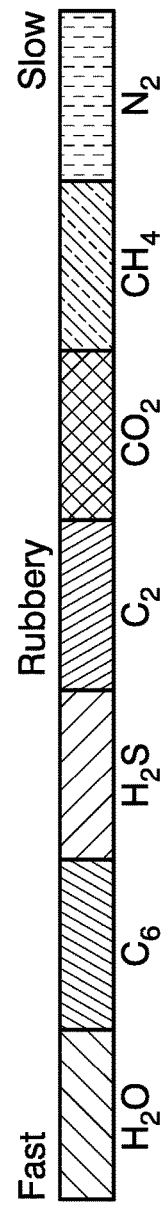
FIG. 3 illustrates relative permeation rates for a rubbery membrane separation unit for bulk impurity removal.

The membrane is robust and is operable with coalescing filters in condensing environments. Ideally the rubbery membrane fiber withstands exposure to VOCs such as benzene, toluene, and xylene (BTX), water, mercaptans or acid gases. An example of relative gas permeabilities for such a rubbery membrane is shown in FIG. 3.

It is recognized that the rubbery membrane is a bulk removal device and may not achieve the low levels of impurities required by the steam reformer catalysts. Thus, after the rubbery membrane, further impurity removal devices can be provided to remove $H_2S$ and VOCs. However, since the rubbery membrane removes much of the impurities, the load on the downstream impurity removal equipment is reduced.

Since steam reformers are very sensitive to even low levels of sulfur prior to the steam reformer, the biogas may be pre-treated to remove residual sulfurs via a zinc oxide bed, or other conventional means that desulfurize the retentate methane feed to very low levels for the steam reformer.

Steam Reforming

For the present invention, the Methane Steam Reforming (MSR) technology is preferably used to produce hydrogen from methane. In this process, the use of a catalyst is mandatory and, if compared to precious metal-based catalysts, Ni-based catalysts assure an acceptable high activity and a lower cost.

The produced syngas is in a high $H_2$/CO ratio, 3:1. The high endothermicity of the reforming reaction requires operating temperatures that are higher than 700° C., and steam-to-methane ratios of 2.5-3.0 are commonly used to reduce coke formation. Accordingly, the MSR process is carried out in industrial furnaces and sustained by burning tail gas from the downstream PSA purifier and the permeate from the membrane separation unit. The most common catalyst used for MSR is nickel, supported on ceramic oxides or oxides stabilized by hydraulic cement. Although other group VIII metals are active, they have some disadvantages: iron, for example, is rapidly oxidized, cobalt cannot withstand the partial pressures of steam, and the precious metals (rhodium, ruthenium, platinum, and palladium) are too expensive for commercial operation. The commonly used supports include α-alumina, magnesia, calcium aluminate, or magnesium aluminate.

Catalytic Water-Gas Shift

The water-gas shift ("WGS") reaction is used to convert carbon monoxide (CO) to carbon dioxide ($CO_2$) and hydrogen ($H_2$) through a reaction with water ($H_2O$). The reaction is exothermic, which means the reaction equilibrium shifts to the right and favors the formation of the $H_2$ and $CO_2$ products at lower temperatures. At higher temperatures, the equilibrium shifts to the left, limiting complete conversion of CO to $H_2$. The reaction is the basis for most of the industrial $H_2$ produced in the world from methane ($CH_4$) in natural gas through steam-methane reforming. Methane is first reformed to a mixture of CO, $CO_2$ and $H_2$ in the presence of steam over a nickel catalyst. A conventional water-gas shift reactor then uses a metallic catalyst in a heterogeneous gas-phase reaction with CO and steam. Although the equilibrium favors formation of products at lower temperatures, the reaction kinetics are faster at elevated temperatures. For this reason, the catalytic water-gas shift reaction is initially carried out in a high temperature shift ("HTS") reactor at 350-370° C.. Conversion in the HTS reactor is limited by the equilibrium composition at the high temperature. To achieve higher conversions of CO to $H_2$, the gas leaving the HTS reactor is optionally cooled to 200-220° C. and passed through a low-temperature shift ("LTS") reactor (Kirk-Othmer, 1995; Ullman's, 1989). Approximately 90% by volume of the CO is converted to $H_2$ in the first HTS reactor and the remaining CO is converted in the LIS reactor.

In the present invention with PSA purification, both the $CO_2$ and the un-reacted CO, along with residual $CH_4$ and water are adsorbed, producing hydrogen purities of over 95%, preferably over 99.9% by volume. Where the feed contains nitrogen, the PSA unit can be optionally designed to remove the nitrogen, but the product purity can be lower than 99.9% and set by the allowable level of nitrogen in the hydrogen product. If desired, the HTS reactor operating temperature can be adjusted to balance higher conversion versus a larger reactor size.

The shift reaction will operate with a variety of catalysts between 400° F. and 900° F.. The reaction does not change molar totals and therefore the effect of pressure on the reaction is minimal. However, the equilibrium for $H_2$ production is favored by high moisture content and low temperature for the exothermic reaction.

A conventional high temperature ("HT") shifting unit useful for the present invention, operates between 550° F. to 900° F. and uses chromium or copper promoted iron-based catalysts. A conventional low temperature ("LT") shifting unit useful for the present invention, if applied, typically used to reduce residual CO content to below 1% by volume, operates between 400° F. to 500° F. and uses a copper-zinc-aluminum catalyst.

Pressure Swing Adsorption Unit ("PSA")

Pressure swing adsorption unit of present invention uses beds of solid adsorbent to separate impurities from hydrogen streams leading to high-purity high-pressure hydrogen and a low-pressure tail gas stream containing the impurities and some of the hydrogen. The beds are then regenerated by depressurizing and purging. Useful PSA systems are specialized adsorbent materials such as zeolites, molecular sieves, activated carbon etc.

Hydrogen Production

The prior art as shown in FIG. 1 demonstrates a conventional process and a system thereof for producing hydrogen from biogas. Specifically, natural gas 1 having low levels of impurities and $H_2S$ at 100° F. is optionally compressed in a main compressor (not shown) to a compressed feed (not shown), having a pressure of at least 100 psig, and is sent via inlet 5 to a pre-treater 25 to remove sulfurs, and the processed stream 30 from pre-treater 25 is then sent to steam reformer 45, wherein steam $H_2O$ 35 is sent via inlet 40 to steam reformer 45 to facilitate the reforming reaction. A separated stream 18 of unprocessed natural gas feed 1 is then sent to steam reformer 45 as fuel 50. The resulting CO and $H_2$ from steam reformer 45 are sent via outlet 55 to a water-shift catalyst bed 60, to react with additional steam $H_2O$ 72 from inlet 65, to produce a stream of $H_2$ and $CO_2$ that is then sent via Outlet 63 to PSA unit 70 for purification to output via outlet 85 as a purified stream of hydrogen 90. A stream 75 of impurities (tail gas) from PSA unit 70 is sent via outlet 80 to combine with unprocessed stream 18 to form fuel stream 50 for steam reformer 45.

Figure 2:
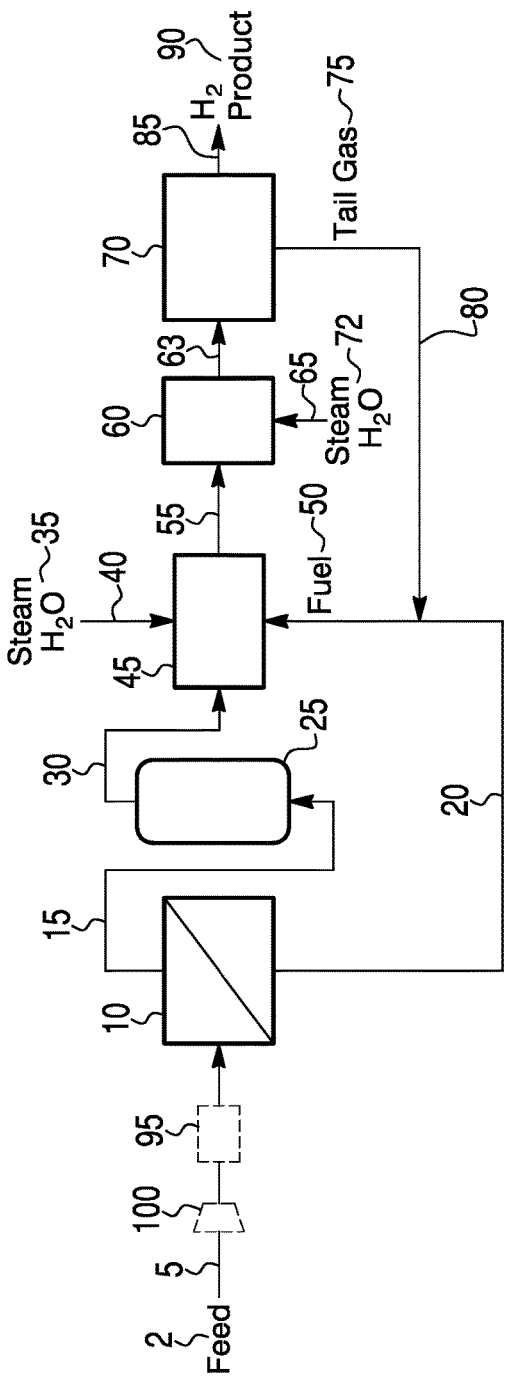
FIG. 2 illustrates a schematic view of a system and a method that produces hydrogen from biogas comprising a steam reformer integrated with a membrane separation unit according to the present invention.

In the present invention, as illustrated in FIG. 2, a biogas or landfill gas feed 2 having impurities of VOCs, siloxanes and optionally up to 5,000 ppm by volume $H_2S$ at 100° F. is optionally compressed in a main compressor (100) to a compressed feed (not shown), having a pressure of at least 100 psig. Feed 2 is sent via inlet 5 to a membrane separation unit of rubbery membranes 10, which permeates a stream 20 of water and impurities such as $H_2S$, $CO_2$ and VOCs. Alternatively, a pre-treater 95 is located prior of feed 2 entering the membrane separation unit 10 to removal some or all the $H_2S$. Permeate stream 20 is sent to steam reformer 45 as fuel, while the retentate from the membrane separation unit 10 is sent as an output stream 15 to a pre-treater 25 to remove residual sulfurs or other impurities. The processed stream 30 from pre-treater 25 is sent to steam reformer 45, wherein steam $H_2O$ 35 is sent via inlet 40 to steam reformer 45 to facilitate the reforming reaction of the retentate or the sulfurized retentate. The resulting carbon monoxide and hydrogen from steam reformer 45 are sent via outlet 55 to a water-shift catalyst bed 60, to react with additional steam $H_2O$ 72 via inlet 65, to produce a stream of $H_2$ and $CO_2$. The stream of $H_2$ and $CO_2$ is then sent via outlet 63 to PSA unit 70 for purification. Outlet 85 a provides a purified stream of hydrogen 90. Hydrogen stream 90 contains at least over 95% of $H_2$. A stream 75 of impurities (tail gas) from PSA unit 70 is sent via outlet 80 to combine with permeate stream 20 to form fuel stream 50 for steam reformer 45.

Alternatively, at least one additional purification unit (not shown) can be placed between membrane separation unit 10 and steam reformer 45 to remove additional impurities from permeate 20, prior to the treated permeate stream 20 combining with stream 75 from outlet 86 to enter steam reformer as fuel 50.

Useful purification units are selected from the group consisting of non-regenerable or regenerable adsorbent beds containing activated alumina, silica gel, activated carbon, molecular sieves, or mixtures thereof.

| PROPHETIC EXAMPLE #1 | | | |
|---|---|---|---|
| | Feed | Retentate to MSR | Permeate to Fuel |
| Flow, SCFM | 1000 | 550 | 450 |
| Pressure, PSIA | 400 | 380 | 20 |
| Temperature, F. ° | 100 | 100 | 100 |
| Based on 100 mol feed, Mol % | | | |
| $CH_4$ | 55.00 | 85.00 | 18.33 |
| $CO_2$ | 44.40 | 14.87 | 80.49 |
| VOCs | 0.10 | 0.03 | 0.19 |
| $H_2O$ | 0.50 | 0.10 | 0.99 |

In the prophetic example above, landfill gas on an air-free basis and containing $CH_4$, $CO_2$, VOCs and water vapor is sent to a rubbery membrane at 400 psia. $H_2S$ is assumed pre-removed or not present. The membrane permeates VOCs, $H_2O$ and $CO_2$ and produces an enriched $CH_4$ stream at 85% by volume purity reduced in $CO_2$, VOCs, and water. The rejected (permeated) impurities along with lost $CH_4$ is sent as fuel to a steam reformer at 20 psia. The enriched CH₄ stream is optionally treated and sent to the steam reformer for hydrogen production as outlined in the Hydrogen Production section.

PROPHETIC EXAMPLE #2

|  | Feed to Membrane | Retentate to Adsorption Unit | Retentate after Adsorption unit | Permeate to Fuel |
|---|---|---|---|---|
| Flow, SCFM | 1000 | 550 | 549.9 | 450 |
| Pressure, PSIA | 400 | 380 | 380 | 20 |
| Temperature, F. ° | 100 | 100 | 100 | 100 |
| Based on 100 mol feed, Mol % | | | | |
| CH₄ | 55.00 | 85.00 | 85.02 | 18.33 |
| CO₂ | 44.40 | 14.87 | 14.87 | 80.49 |
| VOCs | 0.10 | 0.03 | 0.01 | 0.19 |
| H₂O | 0.50 | 0.10 | 0.10 | 0.99 |

In the prophetic example above, landfill gas on an air-free basis and containing $CH_4$, $CO_2$, VOCs and water vapor is sent to a membrane at 400 psia. $H_2S$ is assumed pre-removed or not present. The membrane permeates VOCs, $H_2O$, and $CO_2$ and an enriched $CH_4$ stream at 85% by volume purity reduced in $CO_2$, VOCs and water is produced. The retentate from the membrane that is reduced in VOCs to 300 ppm is further treated in an adsorption unit that adsorbed VOCs such that the resulting high-pressure stream from the adsorption unit is reduced in VOCs to <100 ppm. The rejected impurities from the membrane unit along with lost $CH_4$ is sent as fuel to the steam reformer at 20 psia.

The invention claimed is:

1. A method to produce hydrogen from biogas, comprising:
Passing a biogas feed to a membrane separation unit containing at least one polymeric gas separation membrane having a selectivity for $H_2S$ over $CH_4$, to produce a) a permeate having less than 30% by volume methane and impurities including $H_2S$, water, siloxane, $CO_2$, VOCs and mixtures thereof, and b) a retentate methane stream having at least 60% by volume methane, and impurities reduced in concentration as compared to said biogas feed;
Feeding said retentate to a steam reformer to produce an output stream of hydrogen and carbon monoxide, wherein said steam reformer is partially fueled by said permeate of said membrane separation unit;
Water-gas shifting said output stream from said steam reformer to produce a wet stream of hydrogen and carbon dioxide;
Purifying said wet stream with a pressure swing adsorption (PSA) unit to remove impurities from said wet stream to produce a purified hydrogen stream.

2. The method of claim 1 wherein said biogas feed contains 40-70% by volume of methane ("CH₄") and impurities of up to 10% by volume nitrogen ("N₂"), up to 1% by volume oxygen ("O₂"), 20-55% by volume of carbon dioxide ("CO₂"), up to 5,000 ppm by volume of hydrogen sulfide ("H₂S"), siloxanes, up to 2,000 ppm by volume by volume of VOCs and water.

3. The method of claim 1, wherein said at least one membrane of said membrane separation unit is comprised of a porous polymeric substrate having at least one separation layer, wherein said substrate is selected from the group consisting of polyimides, poly sulfones, polyether ether ketones ("PEEK"), and mixtures thereof.

4. The method of claim 3, wherein said separation layer is made of a copolymer or block polymer of the formula:

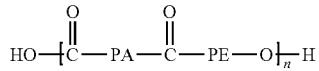

where PA is an aliphatic potyamide having 6 or 12 carbon atoms and PE is either poly(ethylene oxide) or poly (tetramethylene oxide).

5. The method of claim 3, wherein said separation layer is made of repeating units of the following monomers:

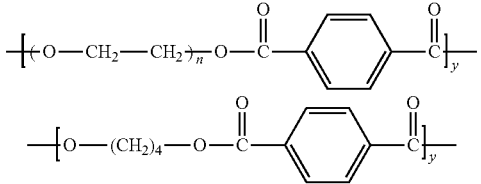

6. The method of claim 3, wherein said separation layer is made of a copolymer or block polymer of tetramethylene oxide, propylene oxide, and/or ethylene oxide.

7. The method of claim 1, wherein said at least one membrane of said membrane separation unit is in the form spirally round sheets, flat films, or a plurality of hollow fibers.

8. The method of claim 1, wherein said at least one membrane of said membrane separation unit has a selectivity of at least 10 in the ratio of permeance for $H_2S$ over $CH_4$.

9. The method of claim 1, wherein said retentate is comprised of at least 60% by volume methane, and impurities containing less than 25% by volume $CO_2$, less than 1,000 ppm by volume of $H_2S$, less than 100 ppm by volume of VOCs and siloxane, and less than 0.5% by volume of water.

10. The method of claim 9, wherein said retentate is comprised of at least 80% by volume of methane, and impurities containing below 10% by volume of $CO_2$, below 100 ppm by volume of $H_2S$, below 100 ppm by volume of VOCs, below 100 ppm by volume of siloxane and less than 0.05% by volume of water.

11. The method of claim 1, wherein said permeate is comprised of at most 20% by volume of methane, and impurities containing up to 10,000 ppm by volume of $H_2S$, up to 0.5% by volume of water and up to 85% by volume of $CO_2$.

12. The method of claim 1, wherein prior to said biogas feed passing to said membrane separation unit, said biogas feed is pretreated via a pre-treater to remove some or all $H_2S$.

13. The method of claim 1, wherein prior to sending said retentate to said steam reformer, said retentate is processed by at least one additional purification unit to remove additional impurities.

14. The method of claim 13, wherein said additional purification unit is selected from the group consisting of activated alumina, silica gel, activated carbon, molecular sieves, and mixtures thereof to remove said impurities selected from the group consisting of $H_2S$, VOCs, siloxanes, and mixtures thereof.

15. The method of claim 14, wherein said additional purification produces a low-$H_2S$ stream having less than 4 ppm by volume of $H_2S$.

16. The method of claim 1, wherein said purified hydrogen contains at least 95% by volume hydrogen.

17. The method of claim 1, wherein said biogas feed is compressed via a main compressor to produce a compressed feed stream and said compressed feed stream is fed to said membrane separation unit.

18. The method of claim 1, wherein said impurities or tail gas from said PSA is sent to said steam reformer or mixed with said permeate to form fuel to fuel said steam reformer.

19. A system for producing hydrogen from biogas comprising:
A source of biogas feed;
A membrane separation unit in fluid communication with said biogas feed, to provide a permeate side containing impurities selected from the group consisting of $H_2S$, VOCs, siloxanes, $CO_2$, water vapors and mixtures thereof, and to provide a methane-rich retentate side;
A steam reformer that is in fluid communication with said retentate side, and in separate fluid communication with said permeate side, said permeate side providing fuel to said steam reformer to produce an output stream of hydrogen and carbon monoxide;
A downstream water-gas shifter in fluid communication with said steam reformer to receive said output stream and a feed of steam $H_2O$ to form a wet stream of hydrogen and carbon dioxide;
A pressure swing adsorption ("PSA") unit in fluid communication with said water-gas shifter to receive said wet stream, to remove impurities to produce a stream of purified hydrogen.

20. The system of claim 19, wherein at least one purification unit is in fluid communication with said permeate side of said membrane separation unit to receive said permeate to remove $H_2S$ and impurities, and an outlet is provided from such purification unit to send a purified stream as fuel to said steam reformer.

21. The system of claim 19, wherein said at least one membrane of said membrane separation unit has a separation layer made of a copolymer or block polymer of the formula:

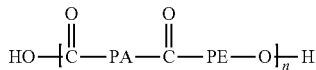

where PA is an aliphatic polyamide having 6 or 12 carbon atoms and PE is either poly(ethylene oxide) poly(tetramethylene oxide).

22. The system of claim 19, wherein said at least one membrane of said membrane separation unit has a separation layer made of repeating units of the following monomers:

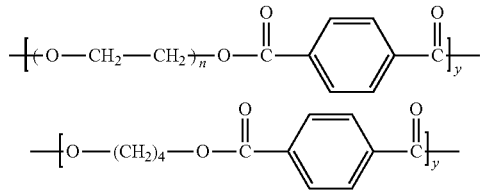

23. The system of claim 19, wherein said at least one membrane of said membrane separation unit is in the form of spirally round sheets, flat film, or as a plurality of hollow fibers.

24. The system of claim 23, wherein each of said at least one membrane of said membrane separation unit has a separation layer that is supported by a support layer, wherein said support layer is made from a material selected from a group consisting of a polyimide, polysulfone, polyether ether ketone and mixtures thereof.

25. The system of claim 19, wherein a pre-treater is in fluid communication with said retentate side of said membrane separation unit to process a retentate to remove residual $H_2S$, VOCs and/or siloxanes, before said retentate is sent to said steam reformer.

26. The system of claim 19, wherein a main compressor is in communication with said biogas feed to compress said biogas feed and said compressed biogas is in communication with said membrane separation unit.

27. The system of claim 19, wherein a pre-treater is in fluid communication between said biogas feed and said membrane separation unit to remove some or all $H_2S$ from said biogas feed, before said feed is sent to said membrane separation unit.

28. The system of claim 19, wherein an outlet from said PSA is in fluid communication with said steam reformer to send said impurities from said PSA to mix with said permeate from said membrane separation unit to form a fuel to said steam reformer.

29. The system of claim 25, wherein said pre-treater is a $H_2S$ scavenger media that produces a treated retentate stream having less than 4 ppm by volume of $H_2S$.

30. The system of claim 20, wherein said purification unit is selected from the group consisting of activated alumina, silica gel, activated carbon, molecular sieves, and mixtures thereof, to remove said impurities selected from the group consisting of $H_2S$, VOCs, siloxanes, and mixtures thereof.

* * * * *

UNITED STATES PATENT AND TRADEMARK OFFICE
CERTIFICATE OF CORRECTION

PATENT NO. : 11,661,341 B1
APPLICATION NO. : 17/669966
DATED : May 30, 2023
INVENTOR(S) : Michael J. Mitariten Page 1 of 1

It is certified that error appears in the above-identified patent and that said Letters Patent is hereby corrected as shown below:

In the Claims

Claim 2, Column 11, Line 62, the phrase "("$H_2S$"), siloxanes, up to 2,000 ppm by volume by volume" should read --("$H_2S$"), siloxanes, up to 2,000 ppm by volume--.

Claim 21, Column 13, Lines 52-53, the phrase "atoms and PE is either poly(ethylene oxide) poly(tetramethylene oxide)." should read --atoms and PE is either poly(ethylene oxide) or poly(tetramethylene oxide).--.

Claim 30, Column 14, Line 51, the phrase "consisting of $H_2$ S, VOCs, siloxanes, and mixtures thereof." should read --consisting of $H_2S$, VOCs, siloxanes, and mixtures thereof.--.

Signed and Sealed this
Twelfth Day of December, 2023

Katherine Kelly Vidal
*Director of the United States Patent and Trademark Office*